May 14, 1957 E. S. WHITE 2,791,805
LINER SLEEVE FOR TIRE RETREADING MOLD
Filed Sept. 3, 1954 3 Sheets-Sheet 1

Eldridge S. White
INVENTOR.

BY Clarence A. O'Brien
and Harvey B. Jackson
Attorneys

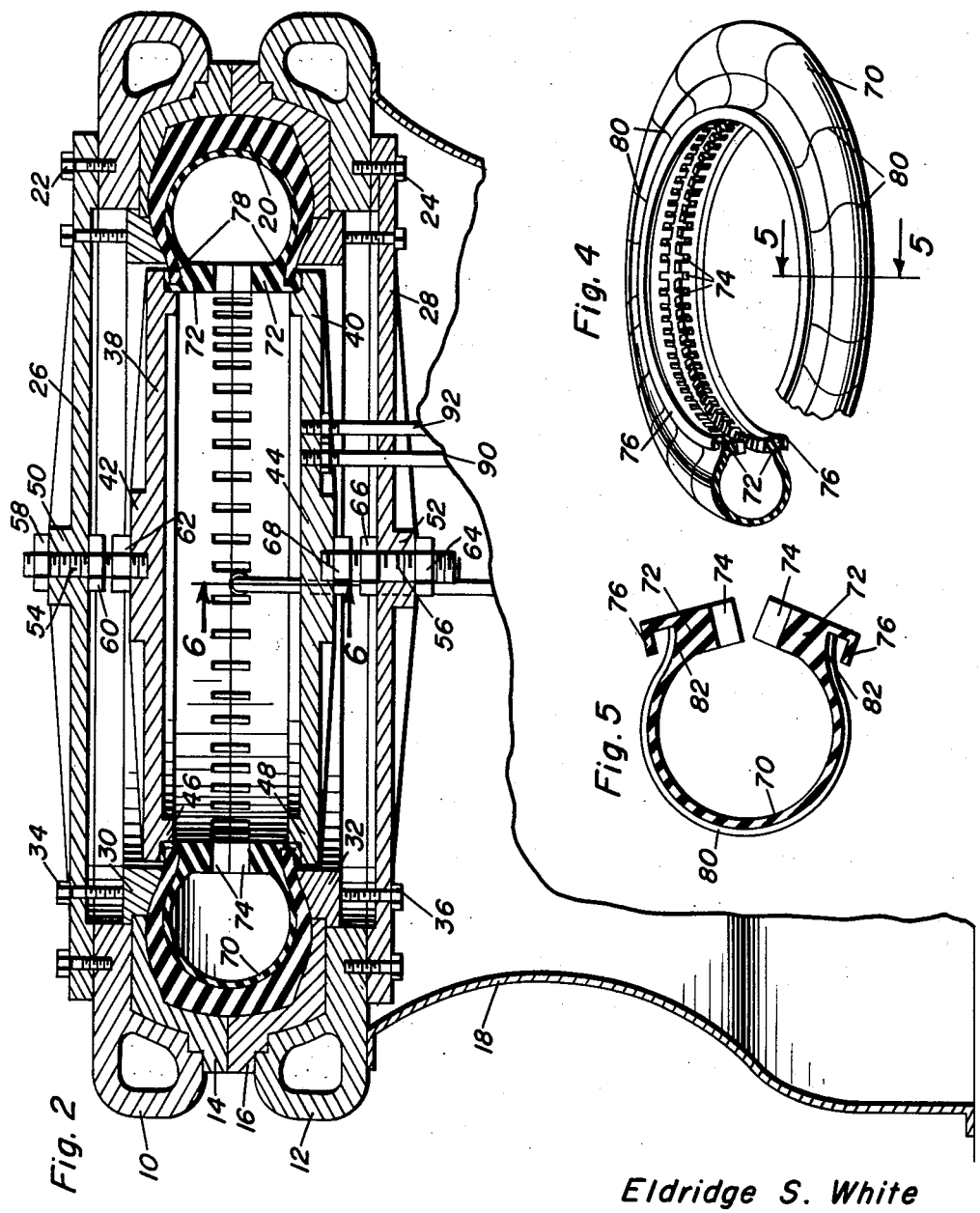

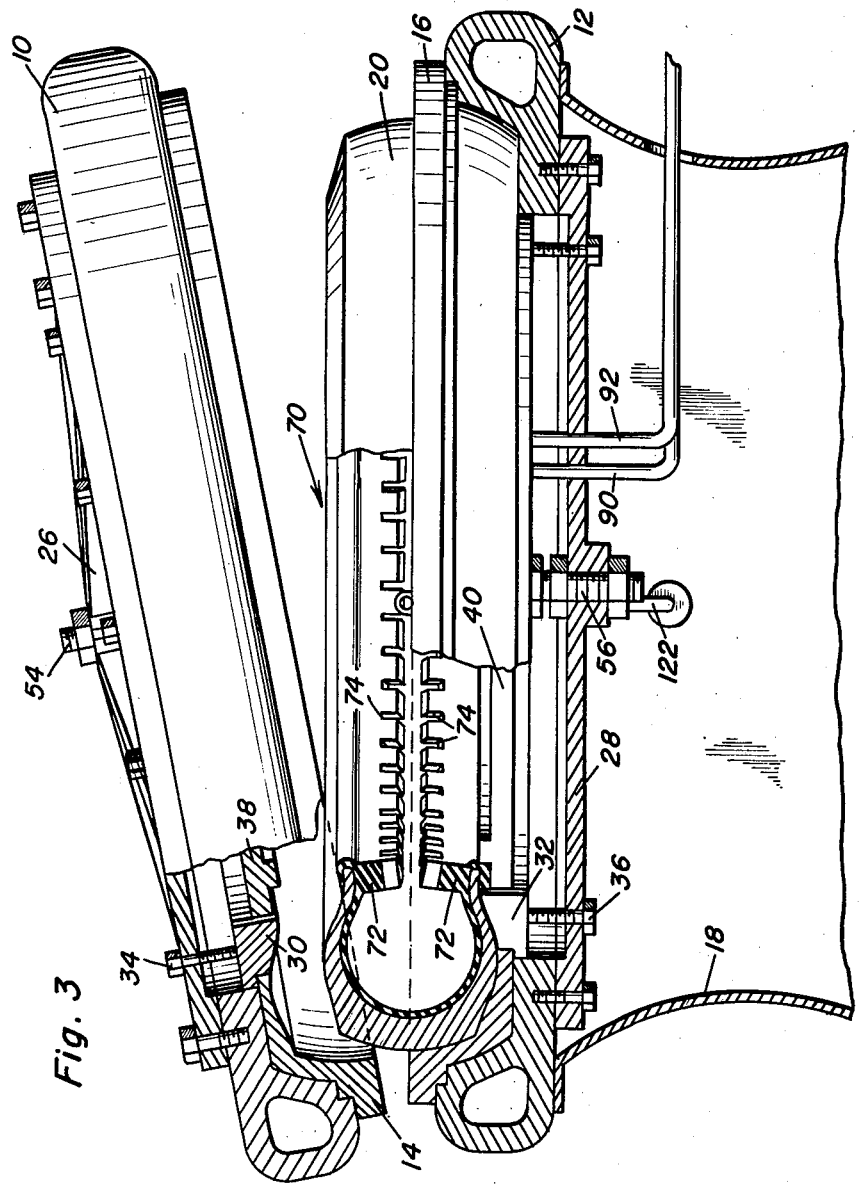

United States Patent Office 2,791,805
Patented May 14, 1957

2,791,805

LINER SLEEVE FOR TIRE RETREADING MOLD

Eldridge S. White, Florence, Ala., assignor to Robbins Tire and Rubber Company, Inc., Tuscumbia, Ala., a corporation of Alabama Application September 3, 1954, Serial No. 454,132

10 Claims. (Cl. 18—18)

This invention comprises novel and useful improvements in a liner sleeve for tire retreading molds and more specifically relates to an apparatus and method which will facilitate and render much more effective the curing of tires in a retreading mold.

The principal object of this invention is to provide an improved liner sleeve and method for more effectively and quickly curing tires in retreading molds.

A further object of the invention is to provide an improved liner sleeve and method of using the same in curing tires which may be readily employed advantageously in the mold apparatuses disclosed in my copending applications, Serial No. 376,804; Serial No. 453,277; Serial No. 447,081; Serial No. 453,817 and which, when so used, will greatly reduce the time required to effect a tire retreading and curing operation.

A still further object of the invention is to provide a liner sleeve which will establish a more efficient fluid-tight sealing engagement with the beads of a tire and with a chamber within a mold apparatus to facilitate pressing of the tire by internal pressure against the matrix of the mold, and the heating and cooling of the tire while in the mold.

Yet another important object of the invention is to provide an improved liner sleeve for tires to be retreaded which will establish an improved fluid-tight seal between the bead of the tire and the adjacent sections of the mold, and yet will establish a fluid communication between the toroidal chamber within the tire casing and a chamber within the interior of the mold apparatus to thereby facilitate the application of fluid under pressure to the interior of the casing for treating the same and the withdrawing of fluid therefrom as desired.

A still further important object of the invention is to provide a liner sleeve for a tire retreading mold which will cooperate with the beads of the tire for simultaneously establishing a fluid-tight sealing engagement therewith, and also will automatically yieldingly press the bead portions of the tire tightly against the adjacent sections of the mold when the mold sections are closed upon the tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a vertical sectional detail view taken upon an enlarged scale substantially upon the plane indicated by section line 2—2 of Figure 1, parts being broken away and showing in vertical section a tire retreading mold in its closed position with a tire casing therein and with the sleeve liner of this invention applied to the tire;

Figure 3 is a view similar to Figure 2 but showing the mold with the upper mold section raised and with the tire resting in the mold and the liner sleeve disposed in the tire in preparation for the closing of the mold section thereon;

Figure 4 is a perspective view, parts being broken away, of the improved liner sleeve in accordance with this invention;

Figure 5 is a vertical transverse sectional detail view taken substantially upon the plane indicated by the section line 5—5 of Figure 4 and upon an enlarged scale and showing the cross-sectional shape and construction of the linear sleeve;

Figure 6:
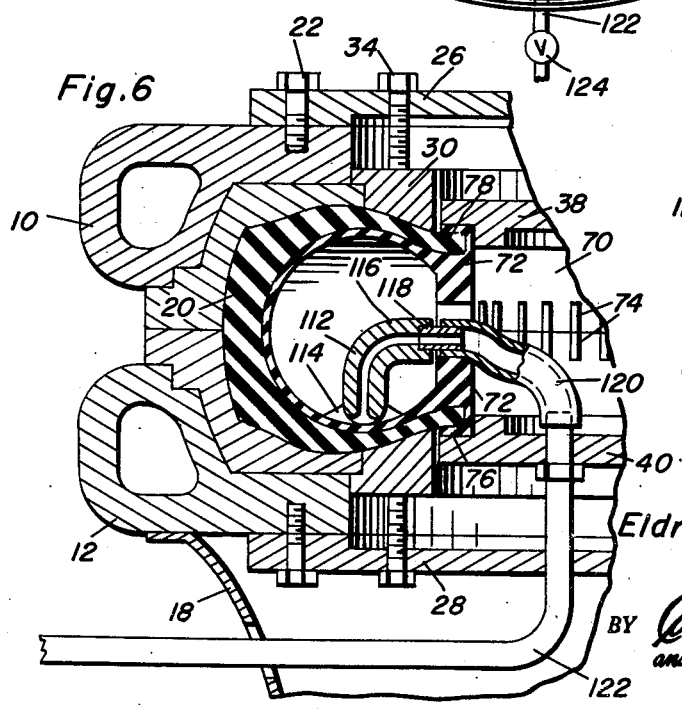
Figure 7:
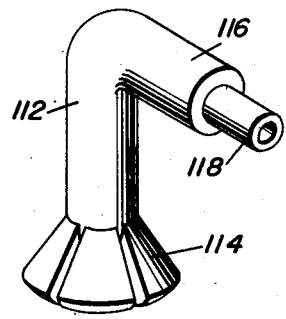

Figure 6 is a vertical transverse sectional detail view taken substantially upon the plane indicated by the section line 6—6 of Figure 2 and showing the position of the liner sleeve with respect to a tire casing and with a mold apparatus, the latter being in its closed position, and especially showing a liquid condensate drain means associated with the liner sleeve for removing condensate from the interior of the tire casing during the treatment of a tire in the molding apparatus; and Figure 7 is a perspective detail view of the condensate drain nozzle shown in Figure 6.

Referring more particularly to Figures 2 and 3, it will be seen that the retreading mold is of a somewhat conventional type including upper and lower movable and stationary mold sections 10 and 12 having the retreading matrices 14 and 16, respectively, associated therewith in a conventional manner, the stationary mold section 12 being supported by a stationary base 18 of a conventional type. A tire casing 20 is illustrated within the mold in position for a retreading and curing operation therein, it being understood that this casing has a layer of camelback retreading material cemented thereon and which is to be vulcanized, retreaded and cured in the retreading mold.

The upper and lower mold sections are ring-shaped, and detachably secured over their open central portions, as by fastening bolts 22 and 24, are upper and lower supporting frames 26 and 28 of any desired design, and which, for example, may be of the type and construction shown in my above identified copending applications. Upper and lower sealing rings 30 and 32 are associated with the upper and lower mold sections, being adjustably positioned relative thereto, as by the fastening and adjusting bolts 34 and 36 carried by the supporting frames 26 and 28. These sealing rings cooperate with the matrices 14 and 16 for engaging the outer side walls of the tire casing to support the same in the proper position for effecting the vulcanizing, retreading and curing operation.

There are further provided upper and lower circular disks or sealing plates 38 and 40 which are adjustably carried by the upper and lower frames 26 and 28, these plates having central raised internally threaded bosses 42 and 44 and being provided with annular ribs or rings 46 and 48 upon their adjacent inward surfaces. The plates, as illustrated clearly in Figure 2, are adapted to have these ribs disposed adjacent the inside rim of the beads of a tire and to have their outer annular surfaces rest against the bead portion of the tires to establish a fluid-tight sealing engagement therewith, as set forth hereinafter. The sealing plates therefore cooperate with the tires for centering or positioning the same properly in the mold in order to enable the retreading and curing operation to be more effectively performed.

At this point, it should be noted that the upper and lower supporting frames 26 and 28 are provided with central raised apertured bosses 50 and 52 through which extend adjusting bolts 54 and 56. The lower ends of these bolts are internally threaded into the bosses 42 and 44 previously mentioned on the sealing plates for supporting the latter, and adjusting and lock nuts 58 and 60 are engaged upon the bolt 54 upon opposite sides of the boss 50 for properly positioning this bolt, while a further lock nut 62 upon this bolt engages the boss 42. Thus, the sealing plate 38 may be adjusted with respect to the supporting frame 26 and locked in adjusted position relative thereto. In a similar manner, locking and adjusting nuts 64, 66 and 68 are provided upon the bolt 56 for the same purpose whereby the sealing plate 40 may be adjustably carried by the lower supporting frame 28.

The operation and advantages of this particular construction by which the sealing plates 38 and 40 are mounted upon the supporting frames 26 and 28 will be set forth in detail hereinafter.

Reference is now made more specifically to Figures 4 and 5 wherein the numeral 70 designates a liner sleeve which is generally C-shaped in cross-section and which is adapted to be inserted within the tire 20 when the latter is adapted to be placed in the retreading mold. The sleeve 70 is of any suitable material, such as rubber or the like, which is impervious to fluid such as air, water, or steam. This sleeve is adapted to form a liner for the interior of the casing 20 to thus render the relatively porous casing fluid-tight whereby the same may be expanded against the internal surfaces of the mold by the application of a fluid pressure to the interior of the tire casing. As will be readily apparent from Figure 5, the toroidal or ring-shaped liner sleeve 70 has upon its inner circumference a circular opening or slot, the opposite sides of which are provided with thickened ribs or rings 72, which upon their adjacent faces are provided with radial, vertically extending slots 74, which conveniently although not necessarily may register with each other to provide radial passages through the thickened ribs of the sleeve liner when the latter is compressed with the thickened portions abutting each other, as shown in Figure 2.

Upon what may be termed their top and bottom surfaces, the thickened ribs 72 are provided with backwardly turned annular flanges 76 which are so shaped as to snugly embrace the beads 78 of the tire casing 20.

Although not absolutely essential, it is desirable that the exterior surface of the liner sleeve 70 shall be provided with a plurality of radially extending grooves 80, these grooves extending into the bottom of the annular grooves formed in the thickened portions 72 beneath the flanges 76.

It is prefered also to provide the thickened portions 72 with curved surfaces 82 constituting seats for receiving the inside surfaces of the beads 78, the surfaces 82 being complementary to the surfaces of the beads to form a close seating engagement therewith.

When the liner sleeve is disposed within the tire 20, it will be seen that the beads 78 are thus received in the grooves of the thickened portions 72 of the liner, the flanges 76 and the seats 82 thus snugly embracing the opposite sides of the beads to establish an effective fluid tight engagement therewith. The engagement of the upper and lower surfaces of the flanges 76 with the annular surfaces of the sealing plates 38 and 40 radially outwardly of the ribs 46 and 48 serve to further enhance the fluid-tight sealing engagement established with the tire.

It will now be observed from an inspection of Figure 2 that when the mold is closed, and a fluid medium under pressure is supplied to the cylindrical space between the two sealing plates 38 and 40, this fluid pressure will be communicated to the toroidal chamber within the sleeve lining inside the tire through the slots 74. This pressure will expand the tire radially against the matrices of the mold and also laterally against the adjacent surfaces of the mold, including the sealing rings 30 and 32, and also against the sealing plates 38 and 40.

It should be observed that in its normal condition, the liner sleeve is in the positions shown in Figures 4 and 5, with the thickened ribs 72 being normally spaced from each other. However, when the liner sleeve is in place in a tire, and the mold is closed, the pressure of the sealing plates 38 and 40 and of the sealing rings 30 and 32 against the walls of the tire will force the beads of the same together and thus force the thickened ribs 72 towards each other, thereby closing the annular space therebetween. This serves the dual functions of causing the beads of the tire to be pressed outwardly away from each other tightly against the abutment surfaces of the mold elements consisting of the matrices, the sealing rings and the sealing plates; and also presses the thickened portions 72 of the liner sleeve towards each other to thus close off communication between the interior of the tire casing and the cylindrical space between the sealing plates except for the communcation established by the slots 74.

As this point, it should be observed that proper adjustment of the sealing rings 30 and 32 by the bolts 34 and 36; and that the sealing plates 38 and 40 by their bolts 54 and 56 will properly position these members to form adjustable abutments limiting outward expansion of the side walls of the tire and thus will adjust the bolt to accommodate different sizes of such tires to thereby more effectively perform the retreading and curing operation upon the same.

Figure 1:
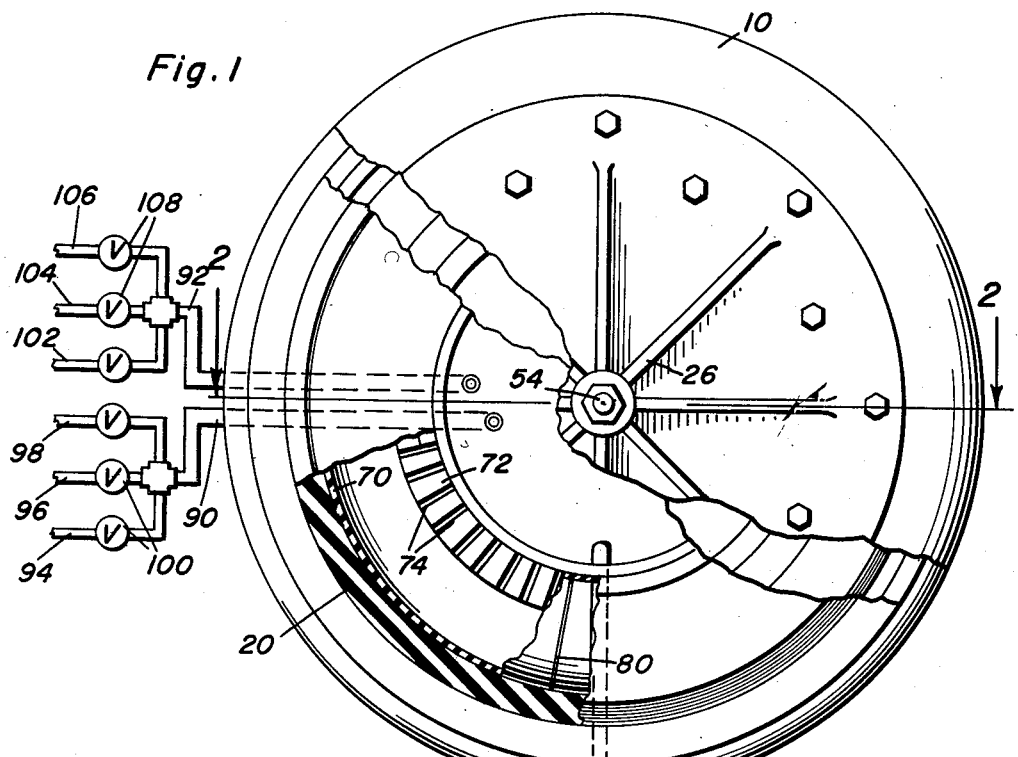
Figure 1 is a top plan view, somewhat diagrammatic and parts being broken away and shown in section of one form of mold apparatus incorporating therein the principles of this invention.

It will be noted that the lower sealing plate 40 is provided with a pair of conduits 90 and 92 which extend therethrough and communicate with the cylindrical space between the sealing plates. The conduit 90 constitutes a fluid inlet means while the conduit 92 constitutes a fluid discharge means. As shown diagrammatically in Figure 1, a plurality of fluid supply pipes 94, 96 and 98, each under the control of a manually adjustable control valve 100, are connected with the supply conduit 90 whereby air, steam or other heating fluid, or water or other cooling fluid, may be selectively delivered under pressure to the interior of the tire casing in the manner above mentioned. In a similar manner, the discharge conduit 92 is provided with individual discharge pipes 102, 104 and 106, each under the control of a manually operated valve 108, whereby the discharge of fluid from the interior of the tire may be controlled, the fluid being capable of being discharged selectively to different receptacles or destinations, as for example, to their respective origins as supplied by the conduits 94, 96 and 98, for reuse. By properly controlling the valves 100 and 108, it is thus evident that any selected fluid may be fed to the interior of the tire under pressure to thus maintain a predetermined pressure therein; this fluid may be replaced by any other desired fluid; and the circulation may be effected of either a heating fluid or a cooling fluid through the tire while maintaining a desired minimum pressure therein.

It is believed evident that by this arrangement, the tire may be internally pressurized to expand the same against the mold for its retreading and curing operation and without any release of pressure, a heating fluid may be substituted to perform the curing operation; and thereafter without any loss of pressure, a cooling fluid may be circulated therethrough to cool the tire prior to its removal from the mold.

It has heretofore been the serious objection in present day tire retreading and curing operations, that tire carcasses absorb moisture and when placed in a retreading mold, this moisture is heatel by the retreading and curing operation above the boiling point of the water. If the mold were opened and/or the pressure released from the interior of the tire before its temperature had dropped below the boiling point of the water absorbed by the fibers of the tire carcass, this moisture would be flashed into steam by the release of pressure and result in damage to the tire and the retreading operation thereon. In the present instance, the tire carcass can be quickly cooled upon its internal, fiber portion, so that any possibility of the absorbed moisture being flashed to steam is completely eliminated, thereby preventing any possible rupture or damage of the retreaded tire by the release of pressure before the tire has cooled below the boiling point of the absorbed moisture; and causing the tire to be cooled for quick removal from the mold without the uneconomical cooling of the mold after each retreading operation.

Means are further provided for removing any condensate, such as that which may occur from the circulation of steam through the sleeve liner during the curing operation, and this means, as shown best in Figures 6 and 7, consists of a condensate removing nozzle 112 which is adapted to be disposed within the interior of a tire and is provided with a head 114. This head, as shown in Figure 6, is disposed adjacent the bottom of the liner sleeve within the tire in a position to receive any condensate collecting in the bottom of the liner sleeve. The upper portion of the nozzle 112 has an elbow 116 which is removably connected, as by a nipple 118, with a flexible conduit 120 which latter, in turn, is connected to a drain pipe 122 passing through the lower sealing plate 40.

The elbow 116, the nipple 118 and/or the flexible tube 120 extend through the thickened ribs 72 of the sleeve liner from the interior of the tire into the central cylindrical space between the sealing plates. It is obvious that the discharge or drain pipe 122 may be provided with a suitable manual control valve, such as the valve 124, shown in Figure 1, whereby condensate may be removed from the tire as desired.

The radial grooves 80 upon the sleeve liner 70 perform a very important function in that when the sleeve liner has been inserted into the carcass of a tire and fluid pressure has been applied to the interior thereof, any moisture which may be present in the tire and pass to the interior surface of the same may flow through these conduits over the exterior surface of the sleeve liner and be discharged from the annular grooves formed between the surfaces 82 and the flanges 76. Thus, this moisture which may be present is permitted to escape or is vented from the interior of the tire carcass and prevented from being forced into the same during the retreading or tire curing operation of the apparatus.

It should be observed that in the operation of this device, as in my above mentioned copending applications for patent, that means are provided whereby the toroidal internal chamber of a tire casing may be sealed from the atmosphere by the engagement of sealing elements cooperating with the beads of the tire whereby a fluid pressure may be directly applied to the interior of the tire for expanding the same against the matrices of the mold and thus give the tire the desired shape and size during the vulcanizing, retreading and curing operations. Still further, in the present instance, this sleeve liner not only establishes a much more efficient seal with the bead of the tire upon both its internal and external surfaces, but also, by the expansible ribs 72, presses the bead portion outwardly against the mold and still further enhances this sealing effect.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tire liner for a tire retreading mold comprising an annular sleeve of a fluid impervious material adapted for insertion in a tire casing, said sleeve having integral opposite annular marginal portions, said portions having a pair of annular grooves each adapted to embrace both the inside and outside surfaces of a tire bead and establish a fluid-tight seal with a bead of a tire, means for supplying fluid under pressure to the interior of the sleeve whereby when the sleeve is positioned in a tire disposed in a retreading mold, the tire will be expanded against the mold.

2. The combination of claim 1 wherein said sleeve has transverse grooves on its exterior surface extending substantially from edge to edge of the sleeve and constituting fluid drain means from the surface of the tire engaged by said sleeve.

3. The combination of claim 1 wherein said sleeve has transverse grooves on its exterior surface constituting fluid drain means from the surface of the tire engaged by said sleeve, said transverse grooves communicating with said annular grooves.

4. A device for use with a mold for retreading tires comprising a support attachable to a mold half, a tire engageable plate adjustably carried by said support, means on said plate for sealing engagement with a beading of a tire casing, means carried by said support urging said plate into a tire engaging position, a liner for a tire, said liner being positionable within a tire for sealing minute holes therein, said liner including annular hook portions engagable over beadings of a tire, said liner being engaged with said first mentioned means.

5. The combination of claim 1 wherein said sleeve includes integral annular resiliently deformable ribs on adjacent surfaces of its adjacent edges, said ribs being of such dimensions and extending towards each other for contact whereby to be placed under compression by the beads of a tire when the retreading mold is closed thereon.

6. The combination of claim 1 wherein said marginal portions of said sleeve include annular resiliently deformable ribs on adjacent surfaces of its adjacent edges, said ribs being of such dimensions and extending towards each other for contact whereby to be placed under compression by the beads of a tire when the retreading mold is closed thereon.

7. The combination of claim 1 wherein said sleeve includes integral annular resiliently deformable ribs on adjacent surfaces of its adjacent edges, said ribs being of such dimensions and extending towards each other for contact whereby to be placed under compression by the beads of a tire when the retreading mold is closed thereon, said ribs having notches therethrough to establish continuous communication between the toroidal interior of the liner and the cylindrical space located between the two marginal portions of the sleeve.

8. The combination of claim 1 wherein said marginal portions project towards each other and provide relatively thickened portions of the material of the sleeve, said annular grooves being disposed in the relatively thickened portions of the sleeve and being located outside of the sleeve.

9. The combination of claim 1 wherein said fluid supplying means comprises openings extending through said marginal portions.

10. The combination of claim 1 wherein said sleeve has transverse grooves on its exterior surface constituting fluid drain means from the surface of the tire engaged by said sleeve, said transverse grooves communicating with said annular grooves, at least some of said transverse grooves extending substantially from one annular groove to the other.

References Cited in the file of this patent

UNITED STATES PATENTS

| | | |
|---|---|---|
| 1,665,440 | Brubaker | Apr. 10, 1928 |
| 1,798,210 | Laursen | Mar. 31, 1931 |
| 2,025,992 | Laursen | Dec. 31, 1935 |
| 2,354,446 | Brown | July 25, 1944 |
| 2,443,955 | Guzik | June 22, 1948 |
| 2,449,461 | Elliott et al. | Sept. 14, 1948 |
| 2,476,831 | Spencer | July 19, 1949 |
| 2,479,493 | Horton-Wellings | Aug. 16, 1949 |
| 2,593,137 | Glynn | Apr. 15, 1952 |
| 2,672,651 | Smyser | Mar. 23, 1954 |